Nov. 27, 1934.  J. W. TOMKINS  1,982,237
PIG FEEDER
Filed March 7, 1934 · 2 Sheets-Sheet 1
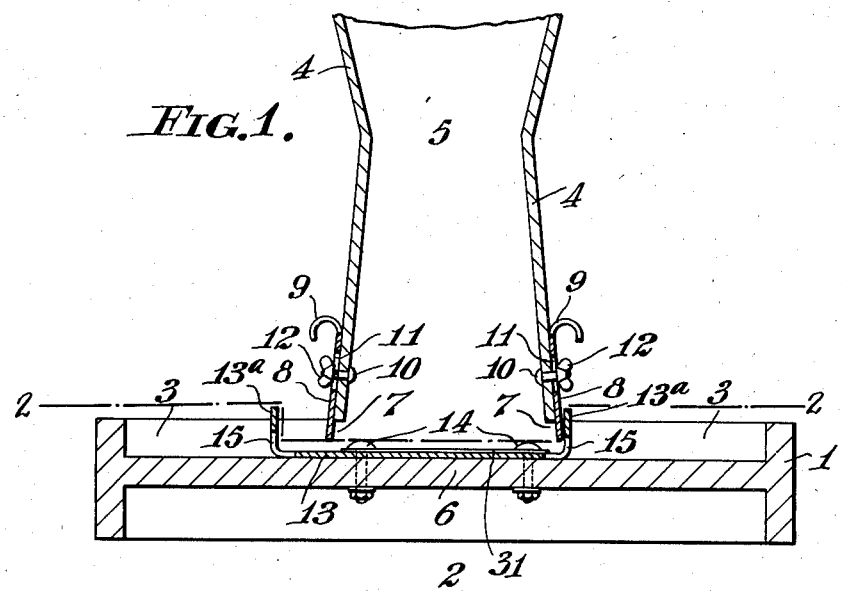
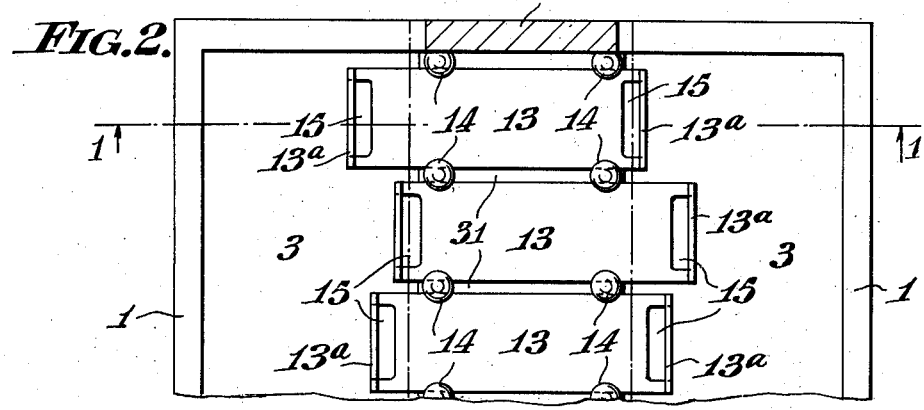
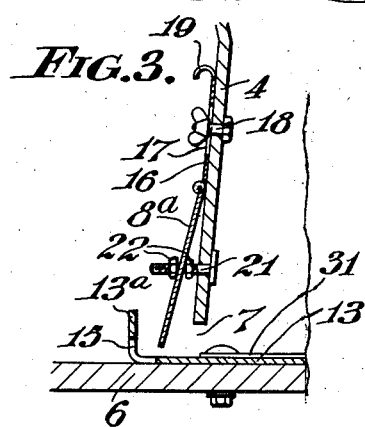
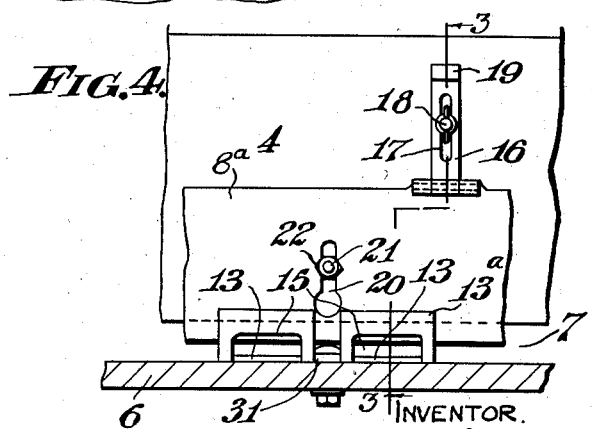
INVENTOR.
JOSIAH WILLIAM TOMKINS
BY
ATTORNEY.

Nov. 27, 1934.   J. W. TOMKINS   1,982,237
PIG FEEDER
Filed March 7, 1934   2 Sheets-Sheet 2

INVENTOR
JOSIAH WILLIAM TOMKINS
BY Benj. I. King
ATTORNEY

Patented Nov. 27, 1934

1,982,237

UNITED STATES PATENT OFFICE 1,982,237

PIG FEEDER

Josiah William Tomkins, Apethorpe, Peterborough, England

Application March 7, 1934, Serial No. 714,438
In Great Britain September 9, 1932

6 Claims. (Cl. 119—53)

This invention relates to pig feeders of the kind comprising a hopper fixedly supported above feeding troughs disposed one on each side thereof, and movable elements operable by the snouts of the animals feeding at the troughs, for delivering or assisting the delivery of food into the troughs from the hopper.

It has been proposed in the above connection to provide in the snout-operated member, a feed plate movable across the open bottom of the hopper, said feed plate having a length not exceeding the overall width of the base of the hopper, so that when one end of a feed plate projects into one of the troughs, the other extremity of said plate assumes a position inwardly of the adjacent wall of the hopper, thus leaving a delivery opening through which the food can gravitate into the adjacent trough.

A defect arising from the use of certain previously proposed pig feeders of the kind above set forth, is that too great a quantity of food may be delivered, or clogging of the food, or jamming of the snout-operated member may occur, these defects resulting from the food gravitating down a direct vertical path and being able to continue to flow whilst the said member is held back.

With a view to obviating these defects, the present invention provides a pig feeder of the kind herein set forth, wherein the snout-operated means comprises a feed plate having a solid area which is greater in length than the distance between the lower ends of the front and rear walls of the hopper, said feed plate being supported in a position in which it is spaced below the open bottom of the hopper, and being mounted for movement across the said open bottom of the hopper, so that in each of its extreme positions a portion of the solid area of the plate projects into the trough.

In one form of the invention, the feed plate is elevated above the floors of the opposite feeding troughs so that in each of its extreme positions a portion of the solid area of the plate projects over one of the troughs. In this manner the food positioned below such projecting portion is not available, and in order to obtain access thereto the animal presses its snout against the projecting end of the feed plate, with the result that food is released at the opposite end and a portion thereof similarly covered by the projecting end of the plate. By the reciprocating motions of the plate substantially equal and constant amounts of food are delivered into the two troughs during the operations thereof.

For a ready understanding of the invention, reference is to be had to the following description and accompanying sheets of drawings illustrating various embodiments of the invention, and wherein:—

Figure 1 is a vertical transverse section taken on the line 1—1 of Fig. 2 of one form of feeder constructed in accordance with the invention.

Figure 2 is a fragmentary horizontal section taken on the line 2—2 of Fig. 1 and illustrative of the feed plates of said feeder.

Figure 3 is a transverse vertical section taken on the line 3—3 of Fig. 4 illustrative of a modified form of the food regulator.

Figure 4 is a front view of the construction shown in Figure 3.

Figure 5:
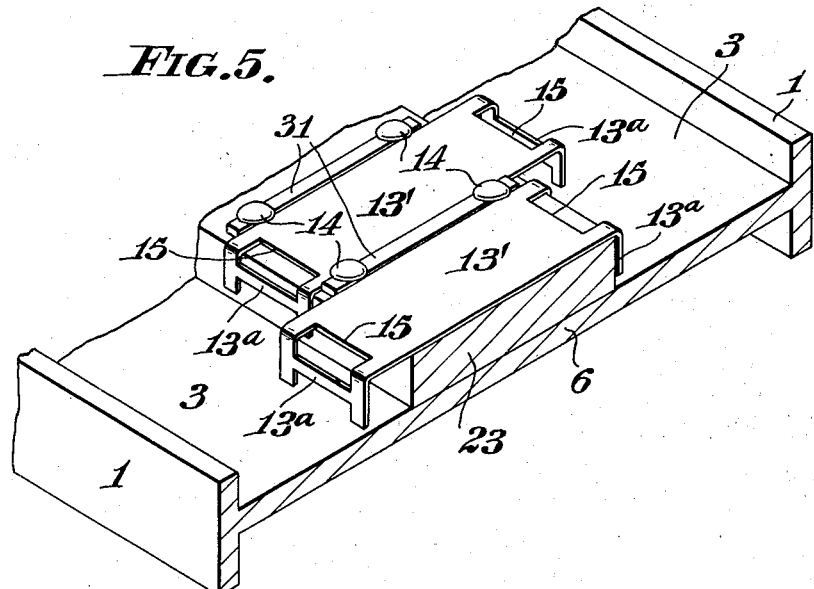
Figure 5 is a fragmentary perspective view illustrative of a modified arrangement of the feed plates.

In carrying out the invention, and referring first to Figures 1 and 2 of the drawings, the feeder comprises a horizontally disposed feeding trough 1 having a vertically disposed hopper 2 fixedly mounted thereon, and extending the length thereof, and disposed centrally therein so as to leave front and rear spaces 3 for the reception of food.

The front and rear walls 4 of the hopper, instead of being arranged in V-formation as is usual, are now so shaped that the hopper 2, in vertical transverse section, is of a medially contracted formation, the contraction 5 being disposed above the bottom 6 of the trough aforesaid.

Each of the front and rear walls 4 of the hopper 2 is provided at its lower end with a longitudinally disposed rectangular opening 7 adapted to be covered, or partly covered over by means of a plate 8 adjustably mounted on the wall 4 of the hopper, each plate 8 having a lifting handle 9 and being adjustable in relation to the opening 7 in the hopper wall 4 by means of a bolt 10 mounted in the wall 4, engaging in a vertical slot 11 in the plate 8, said bolt 10 having a wing-nut 12.

Reciprocatingly mounted on the upper face of the bottom 6 of the trough 1 are a number of feed plates 13, the same being held in position and guided by spaced-apart headed studs 14 mounted in the bottom 6 of the trough 1 and disposed each alongside of the feed plates 13, the edges of which engage under the heads of the studs 14 aforesaid.

Each of the feed plates 13 is constituted by a rectangular plate greater in length than the distance between the lower ends of the front and rear walls 4 of the hopper 2, the ends of each plates 13 being upturned at right angles. A rectangular opening 15 is formed partly in the horizontal portion of the plate, at the end thereof, and partly in the upturned end itself.

These open upturned ends 13a of the feed plates 13 each face a longitudinal opening 7 in the lower end of a side wall 4 of the hopper 2 and are normally positioned somewhat away from said opening 7 so that food is fed from the hopper 3, via the longitudinal openings 7 in the wall, on the feed plates 13 and up to and through the openings 15 in the end of the said feed plates 13.

The feed hopper 2 may be constructed with any convenient number of feed plates 13 disposed side-by-side and guided by the headed studs 14, a row of studs 14 serving the adjacent edges of two feed plates, the feed trough being of a length to suit the number of feed plates.

The regulating plates 8a may, as shown in Figures 3 and 4, each be hingedly connected to the lower end of a plate 16 which is slidable on a wall 4 of the hopper 2, said plate 16 having a slot 17 therein in which engages a bolt 18 provided with a wing-nut, said plate 16 also having a lifting handle 19. The regulating plate 8a aforesaid is in this case provided with a key-hole slot 20 in which engages a threaded bolt 21 provided with nuts 22 disposed one on each side of the regulating plate 8a aforesaid.

Thus, the regulating plate 8a is rendered capable not only of adjustment upwardly and downwardly, but also of movement nearer to or away from the opening 7 of the hopper 2, and also of limiting the inward movement of the adjacent feed plate 13 by the upturned end 13a of the feed plate 13 aforesaid contacting with said regulating plate 8a.

It is desirable under certain conditions, such, for instance, as when the feeder is used outdoors, that the feeding plates 13' be inverted and mounted on a ledge 23 affixed to the upper face of the bottom 6 of the trough 1, as shown in Figure 5, said plates 13' being formed with openings 15 and with their ends 13a down-turned and of an H-shape formation for the pigs to nose the said feed plates 13', the same being guided by the headed studs 14 as in the previously described arrangement of the feeder.

This inverting of the feed plates 13' and the raising thereof by means of the ledge 23, prevents rain water, which may have fallen into the trough 1, from wetting the food, as said food is kept away from the water by resting on the said ledge 23.

Figure 6:
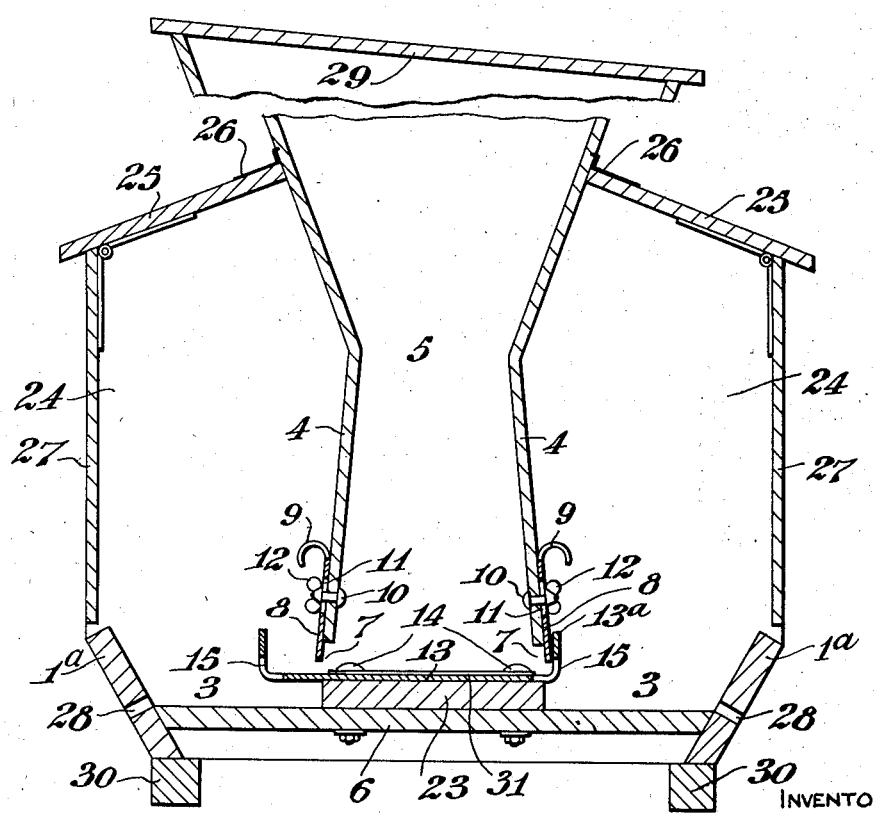
Figure 6 is a transverse vertical section of an outdoors feeder.

Referring now to Figure 6, illustrative of an outdoors pig feeder, the end walls 24 of the hopper 2 are increased in width to form the end walls of the trough 1a, and said end walls 24 are extended to a convenient height above the medially contracted portion 5 of the hopper 2. The end walls 24 of the hopper 2 are bridged together by means of downwardly inclined roof members 25, a metal weather strip 26 being provided at the junction between each roof member 25 and the adjacent wall 4 of the hopper 2 to prevent the entrance of rain water into the trough 1a of the feeder, and a door 27 is hingedly mounted on the underside of each roof member 25 so as to depend vertically therefrom so that the lower part of the feeder is boxed in.

The trough 1 is provided with drain-off holes 28 in its walls to deal with any water which may enter into said trough 1; the hopper 2 is provided with a removable lid 29, and the feeder is mounted on longitudinally disposed runners 30 to facilitate the transport of the said feeder.

The feed plates 13 with upturned ends 13a are slidably mounted on a ledge 23 so that they are raised above the bottom 4 of the trough 1, and the openings 7 are each provided with a regulating plate 8, as described with reference to Figure 1.

Alternatively, feed plates 13' having down-turned ends, as described with reference to Figure 5, may be used in this construction.

With this outdoor feeder, the pigs inwardly push, by their heads, the hingedly mounted doors 27, and by their heads retain said doors raised while they are feeding, said doors automatically closing when said pigs leave the feeder.

A strip 31 of slightly greater thickness than the thickness of the feed plates 13, is interposed between adjacent feed plates 13, and under the heads of the studs 14 to prevent the heads of said studs 14 from pressing on said feed plates 13 in such a manner as to hinder the sliding movements of the feed plates 13 aforesaid.

I claim:—

1. A pig feeder comprising a hopper fixedly supported above a pair of feeding troughs situated one on each side of the hopper and a snout-operated feed plate having a solid area which is greater in length than the distance between the lower ends of the front and rear walls of the hopper, said feed plate being slidably supported in a position in which it is spaced below the open bottom of the hopper, and being mounted for movement across the said open bottom of the hopper so that in each of its extreme positions a portion of the solid area of the plate projects into a trough.

2. A pig feeder comprising a hopper fixedly supported above a pair of feeding troughs situated one on each side of the hopper, a snout-operated feed plate having a solid area which is greater in length than the distance between the lower ends of the front and rear walls of the hopper, and means for supporting said plate in a position in which it is elevated above the floors of the opposite feeding troughs and spaced below the open mouth of the hopper, the feed plate being slidably mounted on said supporting means for movement across the said open bottom of the hopper so that in each of its extreme positions a portion of the solid area of the plate projects over one of the troughs.

3. In a pig feeder, a trough, a hopper above the trough and having a bottom feed opening, a slidable feed plate beneath said feed opening, regulating means for varying the rate of delivery by way of the opening above the feed plate, consisting of an anchorage plate clamped to the side wall of the hopper above the opening at the base thereof, said plate being adjustable in the vertical direction, a flap plate pivotally carried by and depending from said anchorage plate so that its lower end extends over the opening aforesaid, and adjustable means for maintaining the said flap plate in desired angular position with respect to the wall of the hopper.

4. An animal feeder comprising a feeding trough, a hopper supported above the trough and having a bottom feed opening, and a feed plate slidably mounted at the base of the hopper within the feed opening, said plate having angularly disposed end flanges, and the contiguous portions of the plate and the flanges being slotted to provide egress of material therethrough.

5. An animal feeder comprising a base forming a trough, a hopper supported by the base and spaced above the bottom of the trough formed in the base to provide a feed opening at the bottom of the hopper, means carried by the hopper for regulating the area of the feed opening, guide means arranged beneath the mouth of the hopper, and a feeding plate slidably mounted in said guide means and being of greater length than the width of the lower end of the hopper, said feeding plate having an angularly disposed end portion disposed in the zone of said trough.

6. An animal feeder comprising a feeding trough, a hopper supported above the trough and having a bottom feed opening communicating with the trough, and an animal actuated feeding plate of greater length than the width of the lower end of the hopper and slidably mounted transversely of the lower end of said hopper, said plate having angularly offset end portions adapted to be engaged by the feeding animal to shift the plate and also having feed egress openings formed therein.

JOSIAH WILLIAM TOMKINS.